United States Patent Office 2,811,530
Patented Oct. 29, 1957

---

2,811,530

PROCESS FOR THE PREPARATION OF INDOLE AND HOMOLOGUES THEREOF

Louis Poizat, Isere, and Claire Ortoli, Lyon, France, assignors to Societe des Usines Chimiques Rhone-Poulenc, Paris, France, a French body corporate No Drawing. Application October 15, 1956,
Serial No. 615,743

Claims priority, application France October 29, 1955

6 Claims. (Cl. 260—319)

This invention relates to improvements in or relating to the preparation of indole and derivatives thereof. More specifically, the invention is concerned with the preparation of indoles of the general formula:

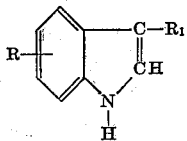

I wherein R and $R_1$ are the same or different and each represents a hydrogen atom or an alkyl group containing 1 to 6 carbon atoms.

It is known to prepare alkali metal salts of indole by reacting an alkali metal alcoholate of the type $R_2OM$ (wherein $R_2$ represents an alkyl or cycloalkyl group and M represents an alkali metal) with N-formyl-o-toluidine, the reaction being schematically illustrated as follows:

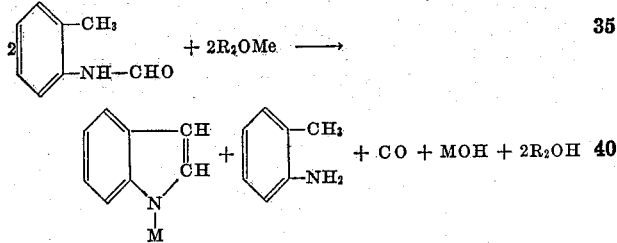

From the alkali metal salt, indole in the form of the free base is obtained by the action of water. Homologues of indole may be obtained in similar manner by replacing the N-formyl-o-toluidine by an appropriate homologue thereof.

According to the present invention indoles of the general formula I are obtained by reacting an N:N'-di-o-alkylphenylformamidine of the general formula:

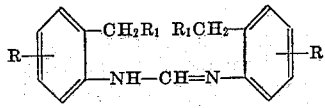

with an alkali metal alcoholate of the type $R_2OM$ (wherein R, $R_1$, $R_2$ and M are as hereinbefore defined) and converting by known methods, such as by treatment with water, the alkali metal salt of the indole thus obtained into the free base. The reaction for the formation of the alkali metal salt of the indole may be illustrated schematically as follows:

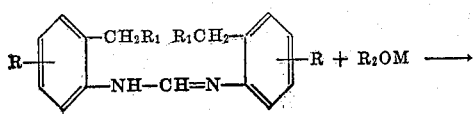

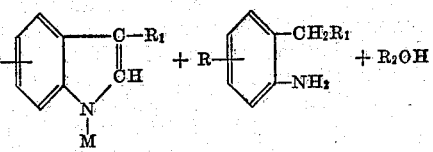

More particularly, the reaction is effected by heating the N:N'-di-o-alkylphenylformamidine and the alkali metal alcoholate in a solvent medium containing the alcohol corresponding to the alcoholate employed, and optionally also the o-alkylaniline corresponding to the formamidine N-substituent, i. e. of the formula:

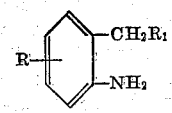

where R and $R_1$ are as hereinbefore defined.

The reaction commences at about 220–250° C. and, while being brought to that temperature and during the subsequent course of the reaction, a distillate is obtained which consists of a mixture of the alcohol and o-alkylaniline which may be separately recovered. The reaction ends when no further distillate is obtained; the product is then cooled, water is added and indole or a homologue thereof is separated from the reaction mixture by known methods, for example, by steam-distilling the aqueous mixture, extracting the indole from the distillate by means of a solvent, distilling off the solvent, rectifying the indole residue and, if desired, crystallising the indole from a solvent.

The N:N'-di-o-alkylphenylformamidines employed as starting materials may be prepared by known methods. A suitable method consists in condensing an o-alkylaniline with ethyl orthoformate in the presence of a trace of hydrochloric acid as catalyst and distilling off the ethanol formed. The formamidine thus obtained need not be isolated and purified. In fact, it is possible and sometimes advantageous to prepare the formamidine in an excess of o-alkylaniline so as to obtain a solution of the formamidine which is more easily handled than a solid product.

Preferably the alcoholates employed are potassium alcoholates. Alcohols serving for the preparation of the alcoholates include methanol, ethanol, isopropanol, and tert.-butanol or alcohols having a higher boiling point, such as cyclohexanol and ethoxyethanol. The alcoholates may be prepared by the action of an alkali metal on the alcohol or by azeotropic dehydration of a mixture of alcohol and alkali metal hydroxide solution.

The following examples illustrate the invention.

*Example I*

There are introduced into a spherical flask, on which is mounted a fractionating column able to separate ethanol from ethyl orthoformate, 2085 g. of ethyl orthoformate, 4500 g. of o-toluidine and 0.5 cc. of hydrochloric acid ($d$=1.18). (An excess of o-toluidine, 1.5 times the theoretical quantity required to react with the ethyl orthoformate, is employed in order that the reaction mixture may remain liquid at about 80–90° C. at the end of the reaction for the purpose of facilitating the procedural steps, the N:N'-di-o-tolylformamidine obtained having a solidification point of 149° C.) The flask is heated. The reaction commences at about 106° C. and ethanol distills over. The distillation is stopped when the temperature reaches 175–180° C., the resulting solution of N:N'-di-o-tolylformamidine in o-toluidine is allowed to cool to 110–120° C., and is then run into a 27.3% solution of potassium cyclohexanolate in cyclohexanol at 130–140° C. (prepared as described below). The pressure is lowered to 280 mm. of mercury and the mixture is heated with agitation.

At first distill 8100 g. of a mixture of o-toluidine and cyclohexanol distills over, and then at about 200–250° C. the reaction commences and 1700 g. of toluidine distills. The temperature of the reaction mixture is raised to 320° C. and when no further distillate is formed the residue is allowed to cool to 150° C. while stirring is continued. A litre of water is added and the indole is steam-distilled from the residue, the temperature being maintained between 120° and 140° C. 18 to 20 litres of water are condensed from which the indole is extracted by means of benzene. The benzene extracts are washed with dilute hydrochloric acid and then with sodium carbonate, the solvent is evaporated and the indole is distilled. 1090 g. of crude product are obtained giving 1000 g. of pure indole on recrystallisation from cyclohexane.

The mixture of cyclohexanol and o-toluidine is taken up in hydrochloric acid to separate the o-toluidine, which is thereafter regenerated from its hydrochloride.

The solution of potassium cyclohexanolate in cyclohexanol referred to above is obtained by heating in a spherical flask provided with a distillation column 9000 g. of cyclohexanol and 1760 g. of 48.8% by weight potassium hydroxide solution, which corresponds to 1.1 molecules of potassium hydroxide to 1 molecule of ethyl orthoformate employed in the preparation of the N:N'-di-o-tolylformamidine. A mixture of 1145 g. of water and 1826 g. of cyclohexanol distills over. At the end of the reaction, there is obtained a 27.3% solution of potassium cyclohexanolate in cyclohexanol, which is cooled to 130–140° C.

*Example II*

There are introduced into a spherical flask provided with a fractionating column, 148 g. of ethyl orthoformate, 248 g. of o-ethylaniline and 0.1 cc. of hydrochloric acid ($d=1.18$). The mixture is heated and after distillation of 125 g. of ethanol there are obtained 256 g. of N:N'-di-(o-ethylphenyl)formamidine, which is directly heated with 510 g. of a 16.5% solution of potassium ethoxide in ethanol. 460 g. of ethanol first distill over and then 126 g. of o-ethylaniline. Proceeding as described in Example I there are obtained 79 g. of 3-methylindole.

We claim:

1. Process for preparing an indole of the general formula:

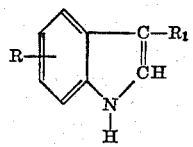

wherein R and $R_1$ are each selected from the class consisting of hydrogen and alkyl groups containing 1 to 6 carbon atoms, which comprises reacting an N:N'-di-o-alkylphenylformamidine of the general formula:

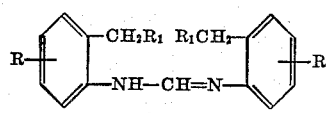

with an alkali metal alcoholate of the type $R_2OM$, wherein $R_2$ is selected from the class consisting of alkyl and cycloalkyl groups and M represents an alkali metal, and isolating the indole thus obtained in the form of the free base from the reaction mixture.

2. Process for preparing an indole of the general formula:

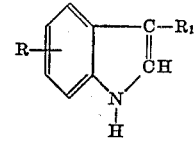

wherein R and $R_1$ are each selected from the class consisting of hydrogen and alkyl groups containing 1 to 6 carbon atoms, which comprises reacting an N:N'-di-o-alkylphenylformamidine of the general formula:

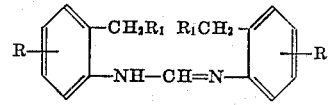

with an alkali metal alcoholate of the type $R_2OM$, wherein $R_2$ is selected from the class consisting of alkyl and cycloalkyl groups and M represents an alkali metal, and isolating the indole thus obtained in the form of the free base from the reaction mixture by treatment with water.

3. Process for preparing an indole of the general formula:

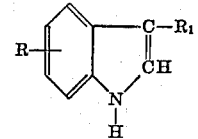

wherein R and $R_1$ are each selected from the class consisting of hydrogen and alkyl groups containing 1 to 6 carbon atoms, which comprises reacting an N:N'-di-o-alkylphenylformamidine of the general formula:

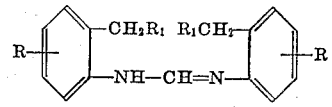

with a potassium alcoholate of the type $R_2OK$, wherein $R_2$ is selected from the class consisting of alkyl and cycloalkyl groups, and isolating the indole thus obtained in the form of the free base from the reaction mixture.

4. Process for preparing an indole of the general formula:

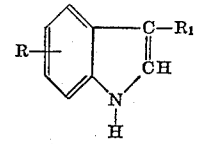

wherein R and $R_1$ are each selected from the class consisting of hydrogen and alkyl groups containing 1 to 6 carbon atoms, which comprises reacting an N:N'-di-o-alkylphenylformamidine of the general formula:

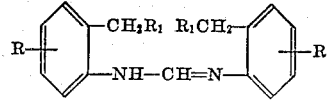

with an alkali metal alcoholate of the type $R_2OM$, wherein $R_2$ is selected from the class consisting of alkyl and cycloalkyl groups and M represents an alkali metal, in the presence of the alcohol corresponding to the alkali metal alcoholate employed and isolating the indole thus obtained in the form of the free base from the reaction mixture.

5. Process for preparing an indole of the general formula:

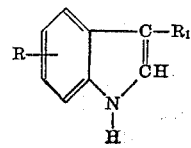

wherein R and R₁ are each selected from the class consisting of hydrogen and alkyl groups containing 1 to 6 carbon atoms, which comprises reacting an N:N'-di-o-alkylphenylformamidine of the general formula:

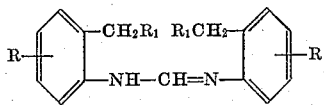

with a potassium alcoholate of the type R₂OK, wherein R₂ is selected from the class consisting of alkyl and cycloalkyl groups, in the presence of the alcohol corresponding to the alkali metal alcoholate employed and isolating the indole thus obtained in the form of the free base from the reaction mixture.

6. Process for preparing an indole of the general formula:

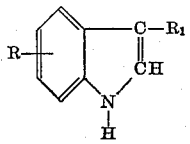

wherein R and R₁ are each selected from the class consisting of hydrogen and alkyl groups containing 1 to 6 carbon atoms, which comprises reacting an N:N'-di-o-alkylphenylformamidine of the general formula:

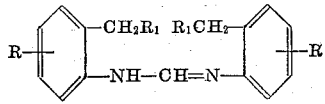

with an alkali metal alcoholate of the type R₂OM, wherein R₂ is selected from the class consisting of alkyl and cycloalkyl groups and M represents an alkali metal, in the presence of the alcohol corresponding to the alkali metal alcoholate employed and an o-alkylaniline of the formula:

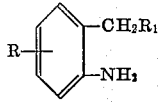

and isolating the indole thus obtained in the form of the free base from the reaction mixture.

No references cited.